United States Patent
Bagnasco et al.

(10) Patent No.: US 7,984,644 B2
(45) Date of Patent: Jul. 26, 2011

(54) CAMSHAFT POSITION MEASUREMENT AND DIAGNOSIS

(75) Inventors: Andrew P Bagnasco, Plymouth, MI (US); Kenneth J. Cinpinski, Ray, MI (US)

(73) Assignee: GM Global Technology Operations LLC

( * ) Notice: Subject to any disclaimer, the term of this patent is extended or adjusted under 35 U.S.C. 154(b) by 173 days.

(21) Appl. No.: 12/541,463

(22) Filed: Aug. 14, 2009

(65) Prior Publication Data

US 2010/0263438 A1 Oct. 21, 2010

Related U.S. Application Data

(60) Provisional application No. 61/169,546, filed on Apr. 15, 2009.

(51) Int. Cl.
*G01M 15/06* (2006.01)
(52) U.S. Cl. .................................. 73/114.26; 73/114.77
(58) Field of Classification Search ............... 73/114.26, 73/114.77, 114.79
See application file for complete search history.

(56) References Cited

U.S. PATENT DOCUMENTS

| | | | | | |
|---|---|---|---|---|---|
| 5,144,920 | A | * | 9/1992 | Imperial | 123/90.15 |
| 5,209,202 | A | * | 5/1993 | Maurer et al. | 123/406.18 |
| 5,245,968 | A | * | 9/1993 | Kolias et al. | 123/480 |
| 5,333,577 | A | * | 8/1994 | Shinojima | 123/90.15 |
| 5,363,817 | A | * | 11/1994 | Ikeda et al. | 123/90.15 |
| 5,463,898 | A | * | 11/1995 | Blander et al. | 73/114.63 |
| 5,562,071 | A | * | 10/1996 | Urushihata et al. | 123/90.15 |
| 6,318,313 | B1 | * | 11/2001 | Moriya et al. | 123/90.15 |
| 6,532,810 | B1 | * | 3/2003 | Ahmed | 73/114.77 |
| 7,421,990 | B2 | | 9/2008 | Taye et al. | |
| 7,783,413 | B2 | * | 8/2010 | Cinpinski et al. | 701/105 |
| 2009/0223472 | A1 | * | 9/2009 | Cinpinski et al. | 123/90.17 |
| 2010/0300387 | A1 | * | 12/2010 | Hu et al. | 123/90.17 |

* cited by examiner

*Primary Examiner* — Freddie Kirkland, III (57) ABSTRACT

A method of operating an engine includes determining a relative position between a first camshaft and a second camshaft during a startup event of the engine when the first camshaft is at a first home position and the second camshaft is at a second home position. The first home position is a first preset angular position of the first camshaft relative to a crankshaft. The second home position is a second preset angular position of the second camshaft relative to the crankshaft when the engine is in an OFF state. The method includes generating a first estimate of the first home position. The method also includes diagnosing a mis-build of the engine based on the relative position, the first estimate and a second estimate of the second home position.

20 Claims, 8 Drawing Sheets

CAMSHAFT POSITION MEASUREMENT AND DIAGNOSIS

CROSS-REFERENCE TO RELATED APPLICATIONS

This application claims the benefit of U.S. Provisional Application No. 61/169,546, filed on Apr. 15, 2009. The disclosure of the above application is incorporated herein by reference.

FIELD

The present invention relates to engine control systems, and more particularly to camshaft position measurement and diagnostic systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A dual-overhead camshaft internal combustion engine (ICE) includes intake and exhaust camshafts. The camshafts are driven by a crankshaft via a timing element. The timing element may include a timing chain or timing belt. Rotation of the camshafts actuates respective intake and exhaust valves relative to an angular position of a crankshaft. Position and timing of the camshafts is controlled during engine operation. Camshaft position and timing characteristics may be determined during an engine synchronization event. An engine synchronization event may occur during an engine startup event.

An engine startup begins when an ignition system of a vehicle is activated, for example, when an ignition key is rotated to an ON position. A vehicle electrical system supplies power to an engine control system when the ignition system is activated. The engine control system causes an engine crank event and an engine synchronization event to occur. The engine is cranked during the crank event to start the engine. A camshaft position sensor is used along with the crankshaft position sensor in order to determine engine position. This is referred to as engine synchronization. Determining engine position refers to determination of piston positions relative to crankshaft and camshaft positions as measured by crankshaft and camshaft sensors. After engine start, the camshaft home positions may be learned relative to the crankshaft position. If the crankshaft home positions are not within a calibratable specification, an engine diagnostic trouble code (DTC) is set. This is referred to as a "mis-build" detection or fault. A mis-build may be detected using an engine diagnostic process.

An engine control system may include camshaft phaser(s). The camshaft phaser(s) may be used to adjust angular positions of camshafts relative to each other and/or relative to a crankshaft. This is referred to as "phasing" of the camshafts. Fixed phase relationships between angular positions of the camshafts and the crankshaft are maintained based on engine design when the engine is in an OFF state. The fixed phase relationships may be adjusted during engine operation by introducing variable phase offsets between the camshafts and/or the crankshaft. The variable phase offsets alter timing of intake valves and/or exhaust valves.

While camshaft phasing can enable various advanced engine control features, camshaft positions relative to a crankshaft need to be accurately determined for engine control. An erroneous determination of camshaft position may result in false indication of a mis-build.

Camshaft positions relative to a crankshaft may be determined when the camshafts are maintained in respective "home" or "parked" positions. A home position refers to a preset angular position of a camshaft relative to a crankshaft when an engine is in an OFF state. A camshaft may be rotated by a camshaft phaser relative to a crankshaft, and away from the home position when the engine is in an ON state. A parked position refers to an angular position of a camshaft after a camshaft phaser restores the camshaft to the home position. Absent an error or aberration in engine operation, the parked position is the same as the home position.

A process for determining a camshaft home position is referred to as a "camshaft home-learn". One implementation of a camshaft home-learn includes estimating a camshaft home position when the camshafts are maintained in respective home positions during an engine startup mode. The estimate may be updated until variance in averages is within a predetermined error range. Although this averaging process provides an accurate estimate of a camshaft home position, the camshaft needs to be maintained in the home position throughout the averaging process.

SUMMARY

In one respect, a method of operating an engine is provided. The method includes determination of a relative position between a first camshaft and a second camshaft. The relative position is determined during a startup event of the engine. The first camshaft is at a first home position and the second camshaft is at a second home position when the relative position is determined. The first home position is a first preset angular position of the first camshaft relative to a crankshaft when the engine is in an OFF state. The second home position is a second preset angular position of the second camshaft relative to the crankshaft when the engine is in an OFF state. The method includes generation of a first estimate of the first home position. The method also includes diagnosis of a mis-build of the engine based on the relative position, the first estimate and a second estimate of the second home position.

In other features, a system for operating an engine is described. The system includes a startup process module, a post-sync process module and a diagnosis module. The startup process module determines a relative position between a first camshaft and a second camshaft. The relative position is determined during a startup event of the engine. The first camshaft is at a first home position and the second camshaft is at a second home position when the relative position is determined. The first home position is a first preset angular position of the first camshaft relative to a crankshaft when the engine is in an OFF state. The second home position is a second preset angular position of the second camshaft relative to the crankshaft when the engine is in an OFF state. The post-sync process module generates a first estimate of the first home position. The post-sync process module also determines a second estimate of the second home position. The diagnosis module diagnoses a mis-build of the engine based on the relative position, the first estimate and the value.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also as used herein, the terms "phase", "phasing" and "phased" refer to an adjustment of a camshaft position relative to a crankshaft position away from a camshaft home position. The term "camshaft home position" refers to a preset angular position of a camshaft relative to a crankshaft when an engine is in an OFF state. A camshaft may be rotated relative to a crankshaft and phased away from the camshaft home position during operation of the engine or when the engine is in an ON state.

An engine startup event may begin when an ignition system of a vehicle is activated, for example, when an ignition key is turned to an ON position. A vehicle electrical system supplies power to an engine control system including an engine control module, sensors and actuators when the ignition system is activated. The engine control module enters into an engine startup mode. During the startup mode, the engine control module initiates a crank event. During the crank event, an electric starter cranks and maintains the engine at an initial speed until fuel and spark of the engine is enabled.

During the engine startup mode, in order for the engine control module to provide fuel and spark commands to propel the engine, the engine control module determines positions of each engine pistons relative to camshafts and a crankshaft. Fuel and spark are enabled according to the relative positions of each engine piston. The piston and camshaft relative positions are determined during an engine synchronization event.

After the engine synchronization event, fuel and spark are enabled. The engine speed is increased, the electric starter is disengaged, and the crank event is terminated. Positions of the camshafts (intake and exhaust) relative to the crankshaft are determined when an engine synchronization event is complete. The engine startup mode terminates when the engine control module has executed engine startup routines to start and maintain the engine at a speed that is greater than a speed threshold.

Camshaft position may be adjusted via camshaft phasing for various control techniques. Camshaft may be phased after a home position of the camshaft is determined. During the engine startup mode, a camshaft may be maintained in a home position to allow the engine control module to determine the camshaft home position relative to a crankshaft. A camshaft may be phased away from a home position during the engine startup mode, referred to as an "early phasing" event of a camshaft. For example, an intake camshaft may be phased to reduce emission output after an engine synchronization event. Phasing a camshaft away from a home position during an engine startup mode prevents a home position of the camshaft from being determined. As a result, an early phasing of a camshaft during an engine startup mode may lead to an unreliable determination and diagnosis of an engine mis-build.

The embodiments of the present disclosure provide techniques for early phasing of a camshaft during an engine startup mode without compromising detection and diagnosis of an engine mis-build.

Figure 1:
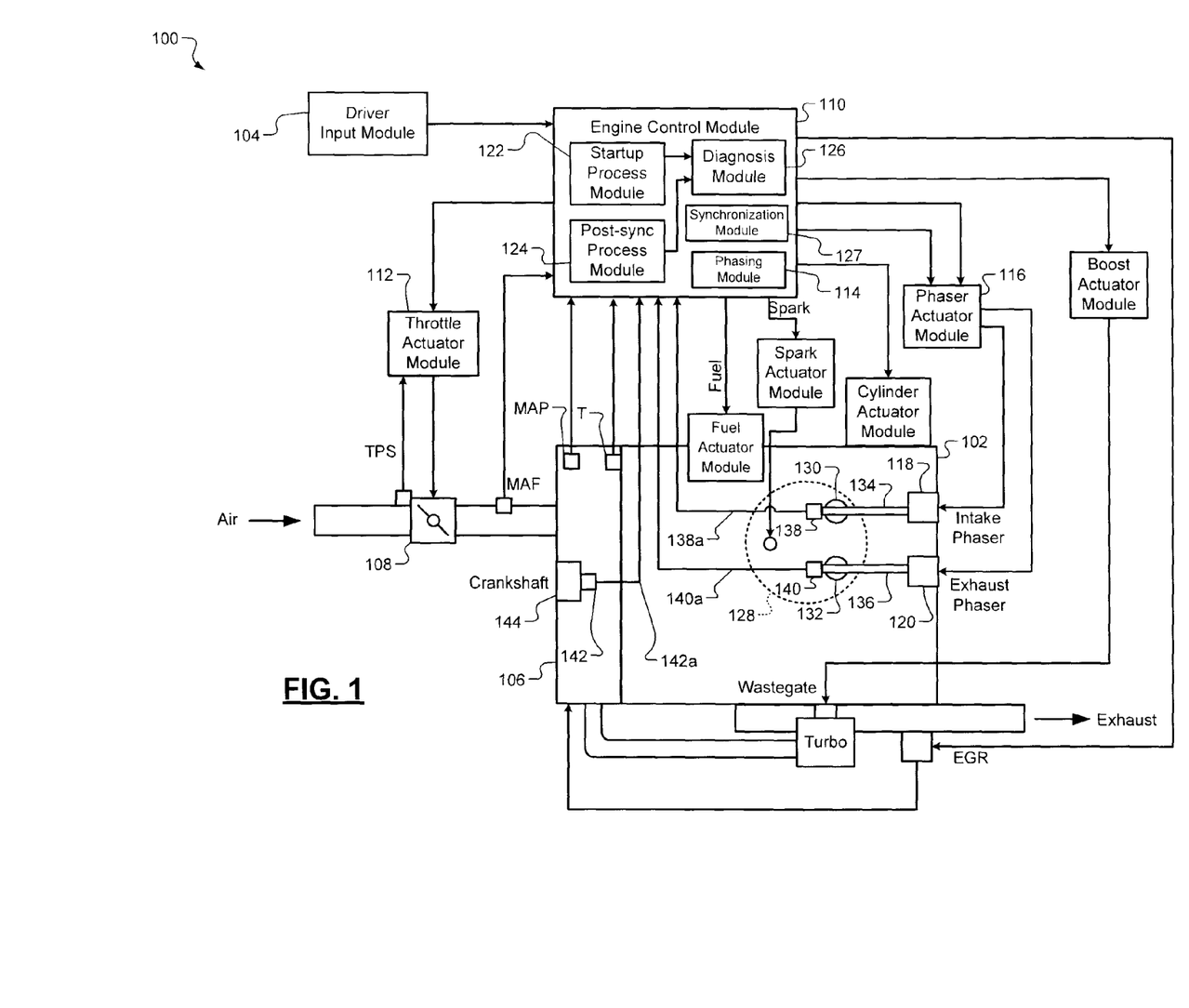
FIG. 1 is a functional block diagram of an exemplary engine system according to the principles of the present disclosure.

Referring now to FIG. 1, an engine system 100 is shown. The engine system 100 includes an engine 102 that combusts an air/fuel mixture to produce drive torque for a vehicle based on an output from a driver input module 104. Air is drawn into an intake manifold 106 through a throttle valve 108. An engine control module (ECM) 110 commands a throttle actuator module 112 to regulate opening of the throttle valve 108 to control the amount of air drawn into the intake manifold 106.

A phasing module 114 in the ECM 110 commands a phaser actuator module 116, which, in turn, operates an intake camshaft phaser 118 and an exhaust camshaft phaser 120. The ECM 110 includes a startup process module 122, a post-sync process module 124 and a diagnosis module 126. The startup process module 122 detects a startup relative position of camshafts relative to each other following a first detection of engine pulses. The post-sync process module 124 detects camshaft home positions after the engine synchronization event. The diagnosis module 126 determines an engine mis-build diagnostic status. A synchronization module 127 performs the engine synchronization event.

Air from the intake manifold 106 is drawn into a cylinder 128 through an intake valve 130. Exhaust gas is discharged through an exhaust valve 132. The intake valve 130 may be actuated by an intake camshaft 134, while the exhaust valve 132 may be actuated by an exhaust camshaft 136. In various implementations, multiple intake camshafts may actuate multiple intake valves per cylinder and/or may actuate the intake valves of multiple banks of cylinders. Similarly, multiple exhaust camshafts may actuate multiple exhaust valves per cylinder and/or may activate exhaust valves for multiple banks of cylinders.

Time at which the intake valve 130 is opened with respect to piston top dead center (TDC) may be varied by the intake camshaft phaser 118. Time at which the exhaust valve 132 is opened with respect to piston TDC may be varied by the exhaust camshaft phaser 120.

An intake camshaft sensor 138 detects tooth profile of a first target wheel (not shown) driven by, and synchronized with the intake camshaft 134. An exhaust camshaft sensor 140 detects tooth profile of a second target wheel (not shown) driven by, and synchronized with the exhaust camshaft 136. The ECM 110 controls the intake camshaft phaser 118 and the exhaust camshaft phaser 120 via the phaser actuator module 116. The camshaft sensors 138, 140 may include a variable reluctance or Hall Effect sensor.

The engine system 100 may include a crankshaft sensor 142 that detects the speed of a crankshaft 144 of the engine in revolutions per minute (RPM). The engine system 100 may include a temperature sensor 148. The engine system 100 may also include a manifold absolute pressure (MAP) sensor 150.

Figure 2:
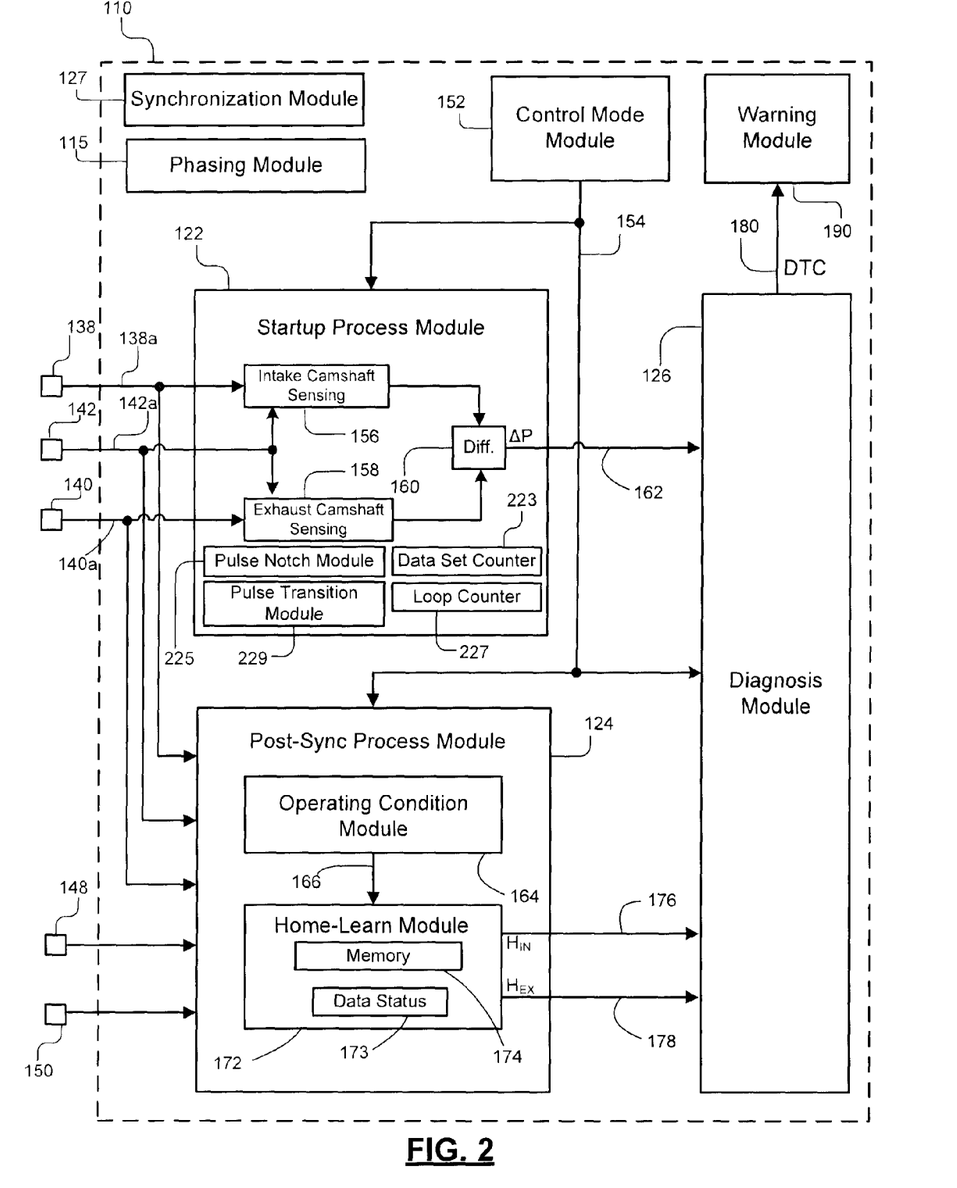
FIG. 2 is a functional block diagram of an exemplary engine control module according to the principles of the present disclosure.

In FIG. 2, the ECM 110 is shown. The ECM 110 may include a control mode module 152. The control mode module 152 may determine various control modes of engine operation including an engine startup mode. The control mode module also provides a control mode signal 154 to the startup process module 122, the post-sync process module 124 and the diagnosis module 126.

The startup process module 122 may include a camshaft sensing module 156 that generates intake camshaft position data based on the intake camshaft sensor signal 138a and the crankshaft sensor signal 142a. The startup process module 122 may also include a camshaft sensing module 158 that generates exhaust camshaft position data based on the exhaust camshaft sensor signal 140a and the crankshaft sensor signal 142a. The startup process module 122 may include a differentiation module 160 that determines a startup relative position and generates a startup relative position estimate $\Delta P$ based on the camshaft position signals from the camshaft sensing modules 156 and 158.

The startup process module 122 may determine a startup relative position $\Delta P$ during an engine startup mode. The engine startup mode may be determined based on the control mode signal 154. The startup process module 122 may generate an estimate signal 162 of the startup relative position $\Delta P$ based on an intake camshaft sensor signal 138a from the intake camshaft sensor 138, an exhaust camshaft sensor signal 140a from the exhaust camshaft sensor 140, and a crankshaft sensor signal 142a from the crankshaft sensor 142.

The post-sync process module 124 may receive the intake camshaft sensor signal 138a, the exhaust camshaft sensor signal 140a, the crankshaft sensor signal 142a, and the control mode signal 154. The control mode signal 154 may indicate when engine control is in an engine startup mode. The post-sync process module 124 may include an operation condition module 164 that detects a camshaft parking condition. A camshaft parking condition may be detected based on engine speed, load and/or temperature. The operating condition module 164 may determine the camshaft parking condition after engine control has completed the engine synchronization event based on a control mode signal 154. The post-sync process module 124 may also include a home-learn module 172. The home-learn module 172 determines intake and exhaust camshaft home positions and generates intake and exhaust camshaft home position estimate signals 176 and 178, respectively.

The home-learn module 172 updates the camshaft home positions when engine operating conditions allow the camshafts to be parked. An active camshaft may not be parked immediately after engine start. An inactive camshaft remains parked during the engine startup, and a home position of the inactive camshaft occurs soon after the engine is started. An active camshaft refers to a camshaft that is phased during an engine startup mode. An inactive camshaft refers to a camshaft that is maintained in home position during an engine startup mode.

After the home-learn module 172 determines a home position of a camshaft (intake or exhaust), the home position data may be stored in non-volatile memory 174 for a current engine ignition cycle. A data status 173 in the home-learn module 172 is also updated to indicate availability of a home position data from the current engine ignition cycle. An engine ignition cycle refers to a period of time from when engine ignition is activated to when the ignition of the engine 102 is disabled. An engine ignition cycle may also be referred to as a key cycle. The home-learn module 172 may send intake and exhaust camshaft home position values of a previous engine ignition cycle to the diagnosis module 126. The previous camshaft home position values may also be stored in the non-volatile memory 174.

The diagnosis module 126 receives the estimate signal 162 of the startup relative position $\Delta P$, the intake camshaft home position estimate $H_{IN}$ from a previous engine ignition cycle, the exhaust camshaft home position estimates $H_{EX}$ from the current engine ignition cycle, and the control mode signal 154. A diagnostic trouble code (DTC) 180 is set and indicated to a warning module 190 when the diagnosis module 126 detects an engine mis-build. The engine mis-build may be detected based on the estimates signals 162, 176, 178 and the control mode signal 154.

Figure 3:
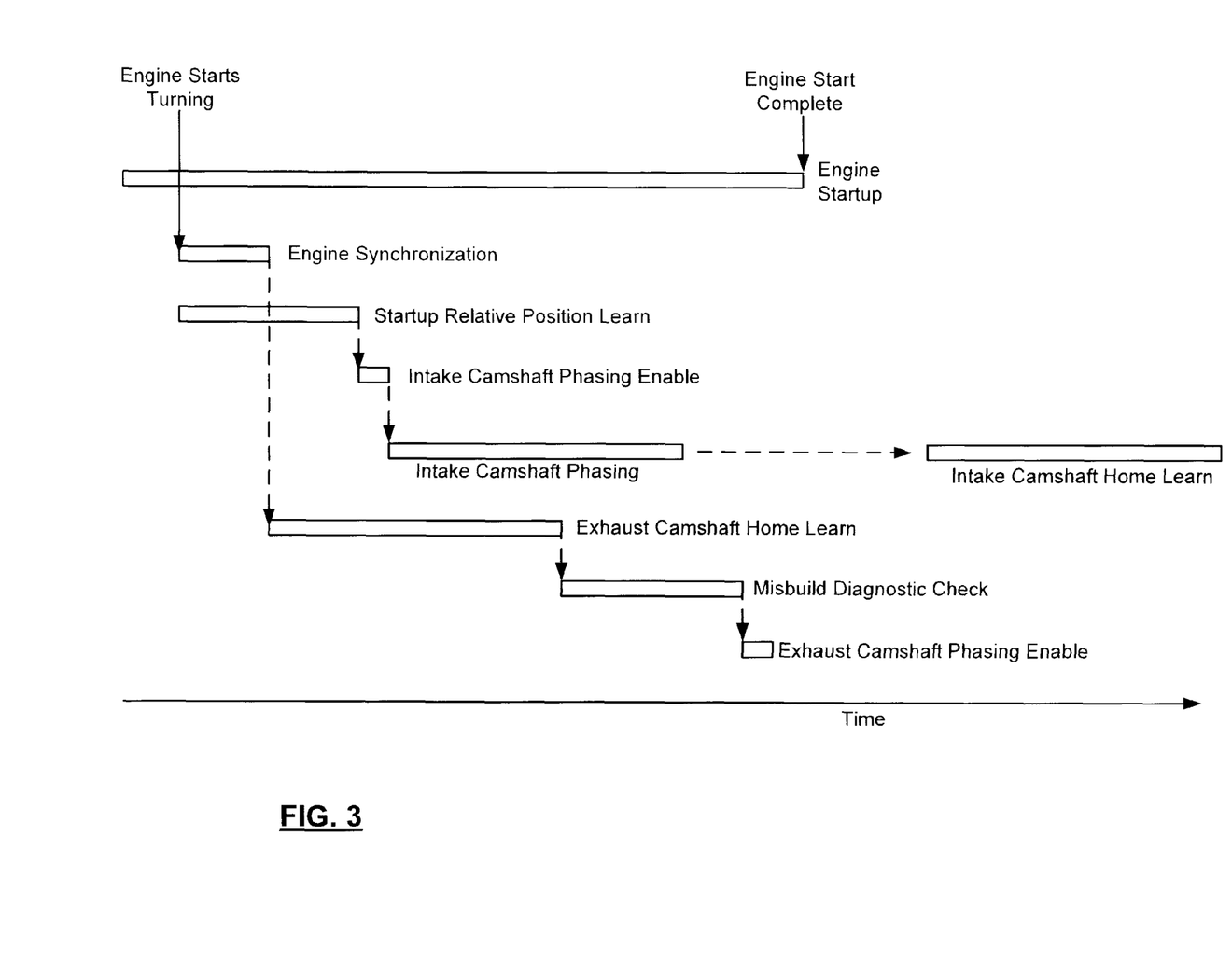
FIG. 3 is a timing diagram of engine control events according to the principles of the present disclosure.

Referring now to FIG. 3, an exemplary timing diagram of engine control events is shown. During an engine startup, the engine control events may include engine synchronization, determination of a startup relative position between an intake and an exhaust cams and exhaust camshaft home-learn. The engine startup may start upon engine starts turning, or a time instant before engine start turning when electric power is delivered to an electric starter motor. The engine startup may end when engine speed exceeds a speed threshold.

The engine synchronization may begin when the engine starts turning. The exhaust camshaft home-learn may start following the engine synchronization. The engine mis-build diagnostic check may start following the exhaust camshaft home-learn. Exhaust camshaft phasing may be enabled following the engine mis-build diagnostic check. The engine mis-build diagnostic check may occur before the end of the engine startup. The exhaust camshaft phasing may be enabled before the end of the engine startup.

The determination of the startup relative position between the intake and exhaust camshafts may begin upon a first detection of engine pulses generated by a crankshaft sensor. Intake cam phasing may be enabled following the determination of the startup relative position. Phasing of the intake camshaft may begin following the enabling of the intake cam phasing. The enabling of intake camshaft phasing and the phasing of the intake camshaft may be performed before the engine startup ends. An intake camshaft home-learn may be performed after the engine startup has ended. The intake camshaft home-learn may be performed when a camshaft parking condition is detected after the engine startup.

Figure 4:
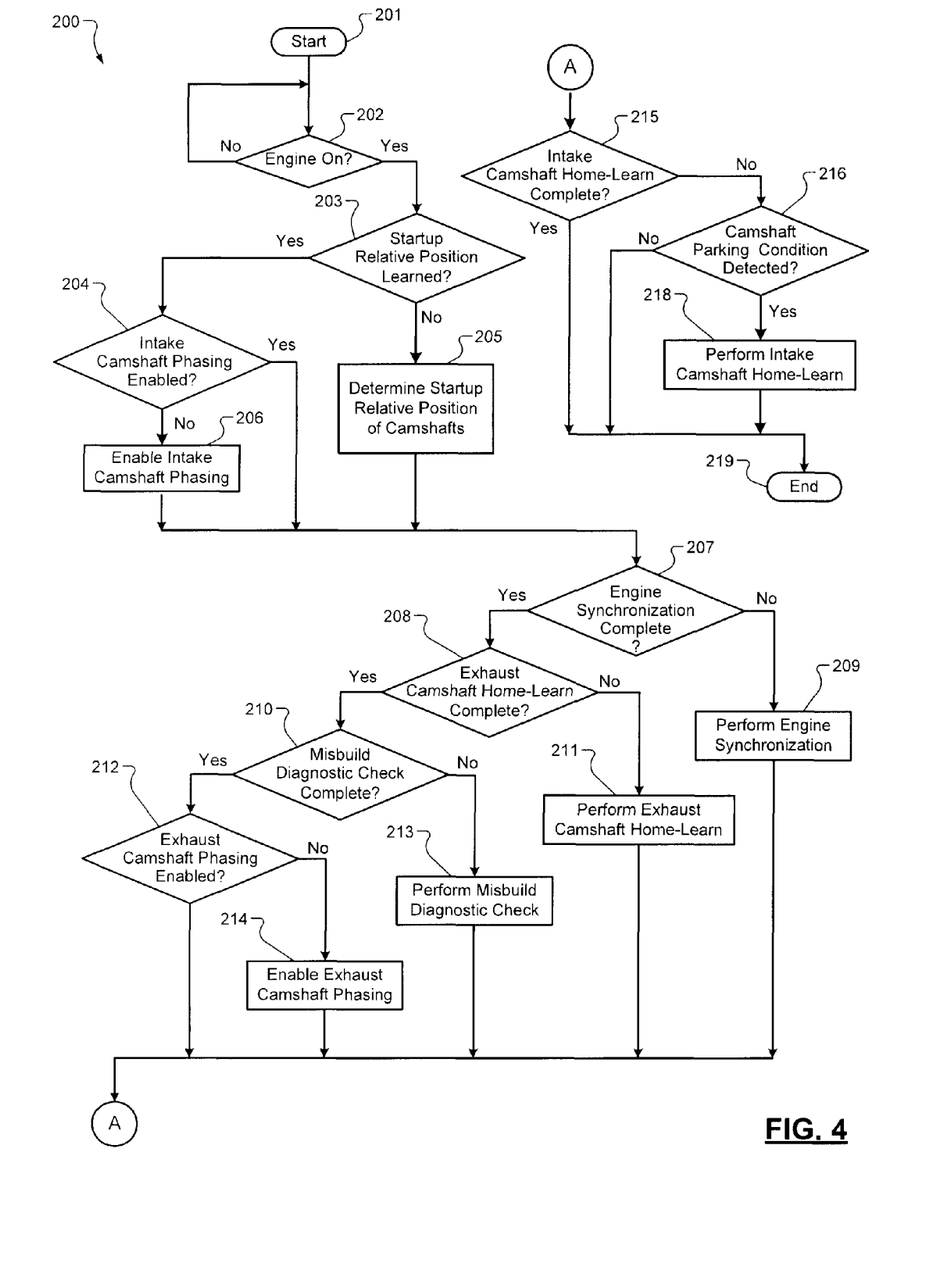
FIG. 4 illustrates a method of operating an exemplary engine according to the principles of the present disclosure.

Referring now also to FIG. 4, a method 200 of camshaft measurement and diagnosis is shown. Control of the ECM 110 of FIGS. 1 and 2 may execute associated steps of the method 200. The method 200 includes function steps to be executed and decision steps to be monitored based on status of engine operating conditions and modes. The method 200 may start at step 201.

In step 202, the ECM 110 monitors status of the engine 102. The status of an engine may be "ON" or "OFF" indicating whether the engine is operational. Control proceeds to step 203 when the engine is ON. Otherwise the ECM 110 continues to monitor the status of the engine 102. The engine status may be detected based on, for example, an activation of an ignition system.

In step 203, the ECM 110 monitors a progress of determination of a startup relative camshaft position between the intake camshaft 134 and the exhaust camshaft 136. Control proceeds to step 204 when the startup relative camshaft position has been determined. Control proceeds to step 205 when the startup relative camshaft position has not been determined.

In step 204, the ECM 110 monitors whether intake camshaft phasing is enabled. Control proceeds to step 206 to enable intake camshaft phasing when the intake camshaft phasing has not been enabled. Control proceeds to step 207 when the intake camshaft phasing has been enabled.

In step 205, the ECM 110 determines a startup relative position based on intake and exhaust camshaft positions. The startup process module 122 may execute step 205. An estimate of the startup relative position ΔP may be generated using equation 1:

$$\Delta P = P_{EX} - P_{IN} \quad (1)$$

$P_{EX}$ is an exhaust camshaft position and $P_{IN}$ is an intake camshaft position. The intake camshaft position $P_{IN}$ is generated by the intake camshaft sensing module 156 based on the intake camshaft sensor signal 138*a*. The exhaust camshaft position $P_{EX}$ is generated by the exhaust camshaft sensing module 158 based on the exhaust camshaft sensor signal 140*a*. Control proceeds to step 207 after step 205.

In step 206, the ECM 110 may enable the intake camshaft phaser 118 to move the intake camshaft 134 away from a home position before an end of the engine startup mode. The phasing module 114 in the ECM 110 enables the phaser actuator module 116 to allow the intake camshaft 134 to be phased. The phaser actuator module 116 may operate the intake camshaft phaser 118 during the engine startup mode. The camshaft phaser 118 phases the intake camshaft 134 away from the home position during the engine startup mode in step 206.

In step 207, the ECM 110 monitors whether engine synchronization is complete. Engine synchronization is complete when intake and exhaust strokes of engine cylinders are determined, and fuel and spark events of the cylinders are enabled and synchronized. Control proceeds to step 208 when the engine synchronization is complete. Otherwise control proceeds to step 209 to perform engine synchronization.

In step 208, the ECM 110 monitors whether an exhaust camshaft home-learn is complete. The exhaust camshaft home-learn is complete when a home position of the exhaust camshaft 136 is determined. Control proceeds to step 210 when the exhaust camshaft home-learn is complete. Otherwise control proceeds to step 211 to perform the exhaust camshaft home-learn.

In step 210, the ECM 110 monitors whether a mis-build diagnostic check is complete. The mis-build diagnostic check is complete when the diagnosis module 126 has determined that a diagnostic status is one of a PASS or a FAIL. Control proceeds to step 212 when the mis-build diagnostic check is complete. Otherwise control proceeds to step 213 to perform the mis-build diagnostic check. The diagnostic status may be determined based on the startup relative position between the intake and exhaust camshafts 134, 136, the home position of the exhaust camshaft 136 determined in step 211 and a home position of the intake camshaft 134 determined in a previous engine ignition cycle.

In step 211, the ECM 110 determines a home position of the exhaust camshaft 136. The home-learn module 172 in FIG. 2 may execute step 211. The exhaust camshaft 136 is not phased away from a home position. While the exhaust camshaft 136 is maintained in the home position, the home-learn module 172 receives the exhaust camshaft position signal 140*a* and generates an estimate signal 178 of the home position of the exhaust camshaft 136.

Using the exhaust camshaft 136 as an example of an inactive camshaft, data associated with a series of exhaust camshaft sensor signals 140*a* is collected. The exhaust camshaft home position may be determined based the sensor signals using an averaging method. The averaging method includes determining an average of the collected data and generating an estimate of the exhaust camshaft home position, for example, using equation 2:

$$H_{EX}(k) = \frac{\sum_{j=1}^{k} P_{EX}(j)}{k} \quad (2)$$

$P_{EX}(j)$ is a j-th detected exhaust camshaft home position where j is the number of detected exhaust camshaft home positions. $H_{EX}(k)$ is an average of the exhaust camshaft home positions after k iterations of data averaging, and is referred to as the exhaust camshaft home position estimate.

In one embodiment, the exhaust camshaft has a camshaft position sensor that generates signals to provide the detected exhaust camshaft positions $P_{EX}(j)$. In another embodiment, the exhaust camshaft has multiple camshaft position sensors. With multiple sensors, each of the exhaust camshaft positions $P_{EX}(j)$ for the j-th iteration may be obtained by taking the average of the outputs of camshaft sensors, an example of which is provided by equation 3:

$$P_{EX}(j) = \frac{P_{EX-1}(j) + P_{EX-2}(j) + P_{EX-3}(j) + P_{EX-4}(j)}{4} \quad (3)$$

The home-learn module 172 iteratively updates the exhaust camshaft home position estimate. Each detected position may be used to generate an updated average. Variation between averages or from average-to-average may be monitored. The home-learn module 172 monitors the variations to determine when the variations decrease to within a predetermined range. Generation of exhaust camshaft home position estimates or inactive camshaft home position estimates may be terminated when the variations are within the predetermined range. For illustrative purposes, in one embodiment, generation of inactive camshaft position estimates is terminated when the variation between estimates is less than a predetermined threshold, as provided by equation 4, where $\Delta H_{TH}$ is the pre-determined threshold.

$$|H_{EX}(k) - H_{EX}(k-1)| < \Delta H_{TH} \quad (4)$$

In another example embodiment, the generation of inactive camshaft home position estimates is terminated when the variation between iterations is less than a predetermined threshold consistently for a predetermined number of consecutive iterations.

In step 212, the ECM 110 monitors whether an exhaust camshaft phasing is enabled. Control proceeds to step 214 to enable the exhaust camshaft phasing when the exhaust camshaft phasing has not been enabled in step 212. Otherwise control proceeds to step 215. Control also proceeds to step 215 after step 209, 211, 213 or 214.

In step 213, the ECM 110 may detect an engine mis-build. Step 213 may be executed by the diagnosis module 126 of FIG. 2. During the engine startup mode, after the inactive camshaft home position is determined, the ECM 110 may detect an engine mis-build using a rough mis-build diagnosis method. In the rough mis-build diagnosis method, the ECM obtains a home position estimate of the inactive camshaft determined during a current engine ignition cycle and a home position estimate of an active camshaft stored in memory from a previous engine ignition cycle. The ECM 110 may detect an engine mis-build based on the home position estimates, along with the startup relative position between the two camshafts measured at engine startup. A rough mis-build diagnosis may be refined when a home position of the active camshaft is determined during the current engine ignition cycle after the engine startup.

In step 215, the ECM 110 monitors whether an intake camshaft home-learn is complete. The intake camshaft home-learn is complete when a home position of the intake camshaft is determined. Control proceeds to step 216 when the intake camshaft home position has not been determined.

In step 216 the ECM 110 monitors a camshaft parking condition for updating camshaft home position(s). The camshaft parking condition may be determined based on engine speed, load and/or temperature. The engine speed may be determined based on the crankshaft sensor signal 142a. The load may be determined based on a signal from the MAP sensor 150. The temperature may be determined based on a signal from the temperature sensor 148. Control proceeds to step 218 to perform the intake camshaft home-learn when a camshaft parking condition is detected.

In step 218, home position of the intake camshaft 134 is determined. The intake camshaft 134 is first restored to a parked position. The home-learn module 172 in FIG. 2 executes step 218 according to a similar method of determining the home position of the exhaust camshaft 136 in step 211. When the home position of the intake camshaft 134 is determined, a data status 173 in the home-learn module 172 is updated to indicate availability of the home position of the intake camshaft 134 from the present engine ignition cycle. Control proceeds to step 219 to end after step 218.

In one embodiment, the ECM 110 may utilize intake and exhaust camshaft home positions of the current engine ignition cycle to detect an engine mis-build. The ECM 110 may detect a camshaft parking condition in step 216, and determine positions of the intake and exhaust camshafts in step 218.

Figure 5:
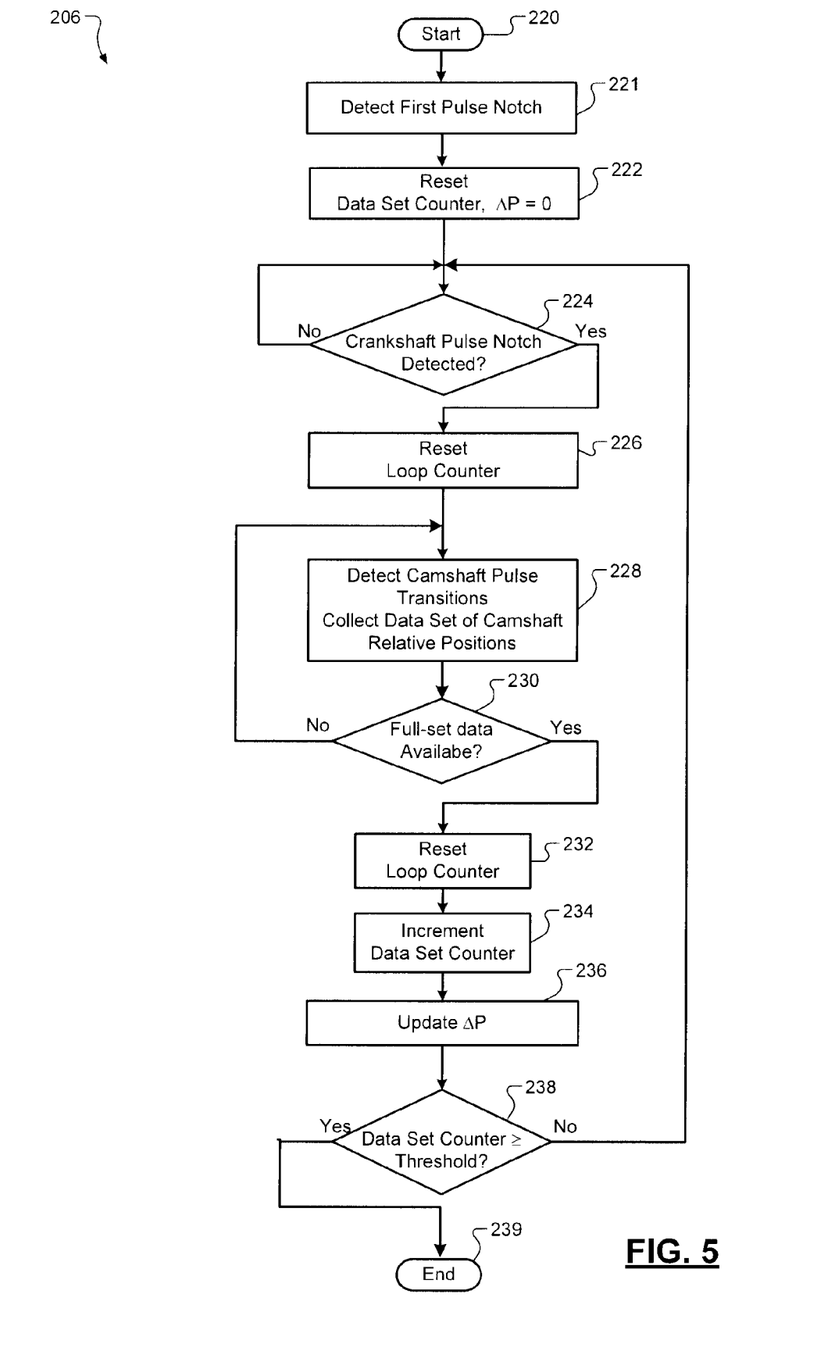
FIG. 5 illustrates a method of determining relative camshaft positions according to the principles of the present disclosure.

Referring now to FIG. 5, a flow diagram illustrating a method 206 of determining the startup relative position between the intake and exhaust camshafts 134, 136 is shown. Control of the ECM 110 may execute associated steps of the method 206. The method may start at step 220.

Figure 6:
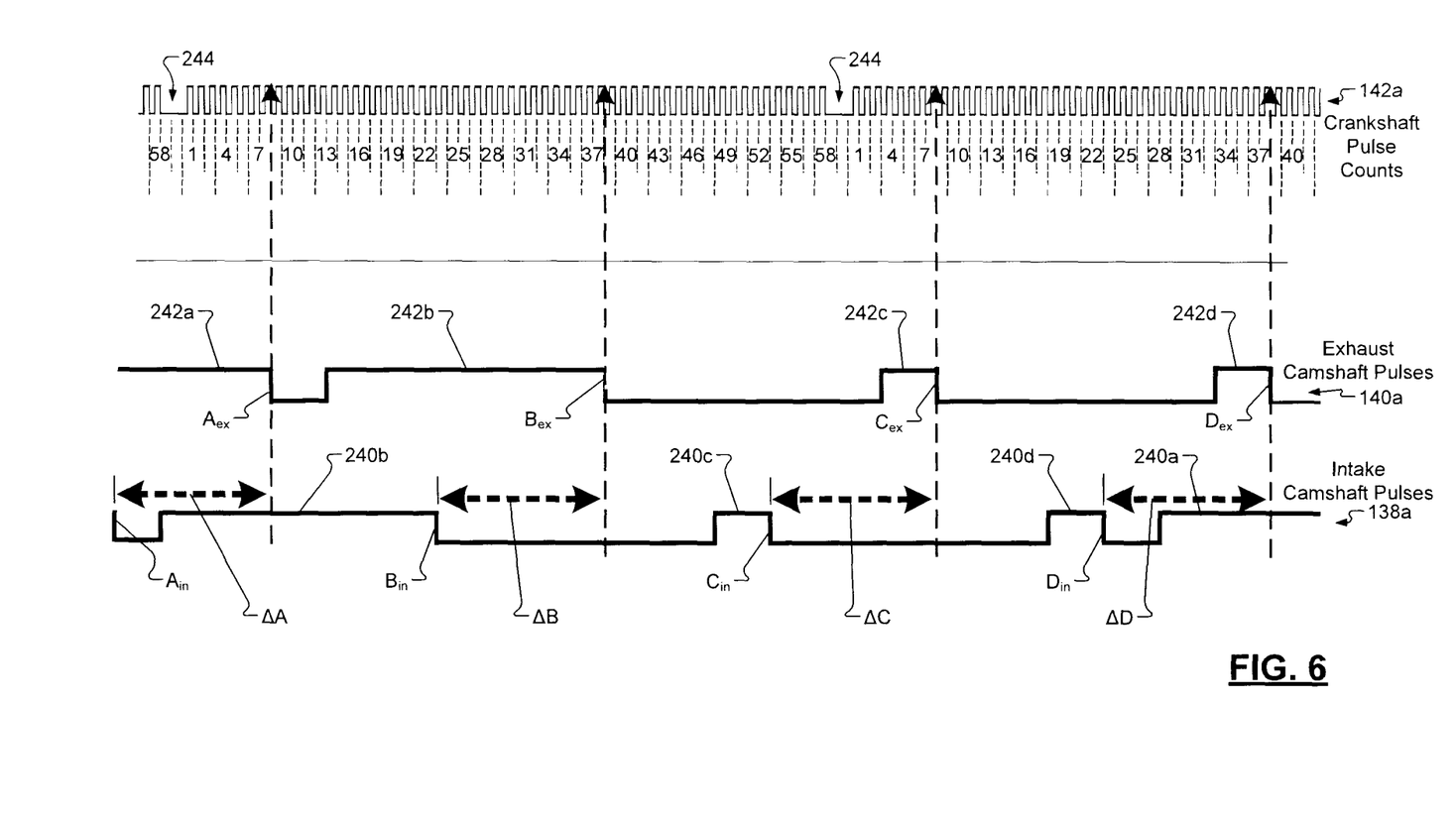
FIG. 6 is an engine timing diagram according to an exemplary embodiment of the present disclosure.

In step 221, a pulse notch module 225 of FIG. 2 detects a first pulse notch of the crankshaft sensor signal 142a. A crankshaft pulse notch refers to an extended low state between pulses of a crankshaft sensor signal, such as the crankshaft sensor signal 142a due to a mechanical notch or extended gap between teeth of a crankshaft timing wheel. Example crankshaft pulse notches 244 are shown in FIG. 6. Time period associated with a crankshaft pulse notch may be equal to the time period associated with multiple pulses. In the example crankshaft pulse notch 244, the time period associated with the pulse notch is equal to that of two pulses.

Control proceeds to step 222 when the first pulse notch is detected. As soon as a valid position pulse is detected, control proceeds forward to determine the relative position between the intake camshaft and the exhaust camshaft without waiting for an engine synchronization event to occur. Determining the relative position between the intake camshaft and the exhaust camshaft is independent of the engine synchronization event. A successful detection of the first pulse notch may represent the valid position pulse for control to proceed forward. Otherwise, control remains in step 221. In one embodiment, control may remain in step 221 for one to two engine revolutions before proceeding to step 222.

In step 222, the ECM 110 performs algorithm initialization. The ECM 110 may reset a data set counter 223 and an initial value of the startup relative position $\Delta P$ in the startup process module 122 of FIG. 2.

In step 224, the pulse notch module 225 detects subsequent crankshaft pulse notches. Control proceeds to step 226 when a subsequent pulse notch is detected. Otherwise, control remains in step 226.

In step 226, the ECM 110 resets a loop counter 227 in the startup process module 122. The method 206 proceeds to step 228 to collect camshaft position data sets based on camshaft position signals before determination of the startup relative position $\Delta P$.

In step 228 the ECM 110 receives camshaft position signals; the position signals include pulses generated by the camshaft sensors 138, 140. In one embodiment, the camshaft position signals may include intake camshaft long and short pulses, and exhaust camshaft long and short pulses. Pulse transitions from high to low state in respective long and short pulses may be detected to determine camshaft positions. A pulse transition module 229 in the startup process module 122 detects camshaft pulse transitions.

In one embodiment, each of the intake camshaft sensor signal 138a and exhaust camshaft sensor signal 140a may include multiple long pulses and multiple short pulses for each camshaft revolution, examples of which are shown in FIG. 6. The intake camshaft sensor signal 138a includes long pulses, for example, Intake-pulse-A 240a and Intake-pulse-B 240b. The intake camshaft sensor signal 138a includes short pulses, for example, Intake-pulse-C 240c and Intake-pulse-D 240d. The exhaust camshaft sensor signal 140a includes long pulses, for example, Exhaust-pulse-A 242a and Exhaust-pulse-B 242b. The exhaust camshaft sensor signal 140a includes short pulses, for example, Exhaust-pulse-C 242c and Exhaust-pulse-D 242d.

The intake camshaft long pulses 240a, 240b make transitions at transition positions $A_{in}$ and $B_{in}$ for the first and second long pulses, respectively. The intake camshaft short pulses 240c, 240d make transitions at transition positions $C_{in}$ and $D_{in}$ for the first and second short pulses, respectively. The exhaust camshaft long pulses 242a, 242b make transitions at transition positions $A_{ex}$ and $B_{ex}$ for the first and second long pulses, respectively. The exhaust camshaft short pulses 242c, 242d make transitions at transition positions $C_{ex}$ and $D_{ex}$ for the first and second short pulses, respectively. When the ECM 110 detects a camshaft pulse transition, a crankshaft pulse count is recorded corresponding to the camshaft pulse transition.

In step 228, the ECM 110 also generates various pulse transition data according to the intake and exhaust camshafts pulse transition. The ECM 110 determines a first long-pulse relative position $\Delta A$, a second long-pulse relative position ΔB, a first short-pulse relative position ΔC and a second short-pulse relative position ΔD according to the detected transition positions:

$$\Delta A = A_{ex} - A_{in} \quad (5a)$$

$$\Delta B = B_{ex} - B_{in} \quad (5b)$$

$$\Delta C = C_{ex} - C_{in} \quad (5c)$$

$$\Delta D = D_{ex} - D_{in} \quad (5d)$$

In one embodiment, measures of the first long-pulse relative position ΔA and the first short-pulse relative position ΔC occur over a crankshaft pulse notch. Pulse counts associated with ΔA and ΔC are inconsistent with those associated with ΔB and ΔD due to missing crankshaft pulses in the notch. Therefore, ΔA and ΔC are excluded from data processing to determine startup relative position. The startup relative position is determined using only data of ΔB and ΔD.

In step 230 the ECM 110 determines whether a full set of camshaft signal data is collected for processing. In one embodiment, a full set of camshaft signal data is detected when a set of $B_{ex}$, $D_{ex}$, $B_{in}$ and $D_{in}$ are recorded. The full set of data may be detected via a loop counter value, for example, when a loop counter value is a multiple of four. When full set of data is collected, the method 206 proceeds to step 232 to reset the loop counter, and proceeds to step 234 to increment a data set counter.

In step 236 the startup relative position ΔP is updated based on the second long-pulse transition positions and the second short-pulse transition positions of the intake and exhaust camshafts using equation 6:

$$\Delta P = \frac{\Delta P*(K-1) + [(B_{ex} - B_{in}) + (D_{ex} - D_{in})]/2}{K} \quad (6)$$

K is the data set counter value representing the number of data sets used to update the startup relative position ΔP.

In one embodiment, signal detection in step 228 and data computation in step 236 are performed before the ECM 110 performs an engine synchronization event. In another embodiment, the signal detection in step 228 is completed before an engine synchronization event while the data computation in step 236, in whole or in part, may be performed after the engine synchronization event has started.

After the ECM 110 updates the startup relative position ΔP in step 236, the ECM 110 determines whether a desired number of iteration has been accomplished. When the data set counter value has reached a predetermined threshold in step 238, the method 206 exits in step 239; otherwise a new set of data will be acquired and processed starting from step 224.

Figure 5A:
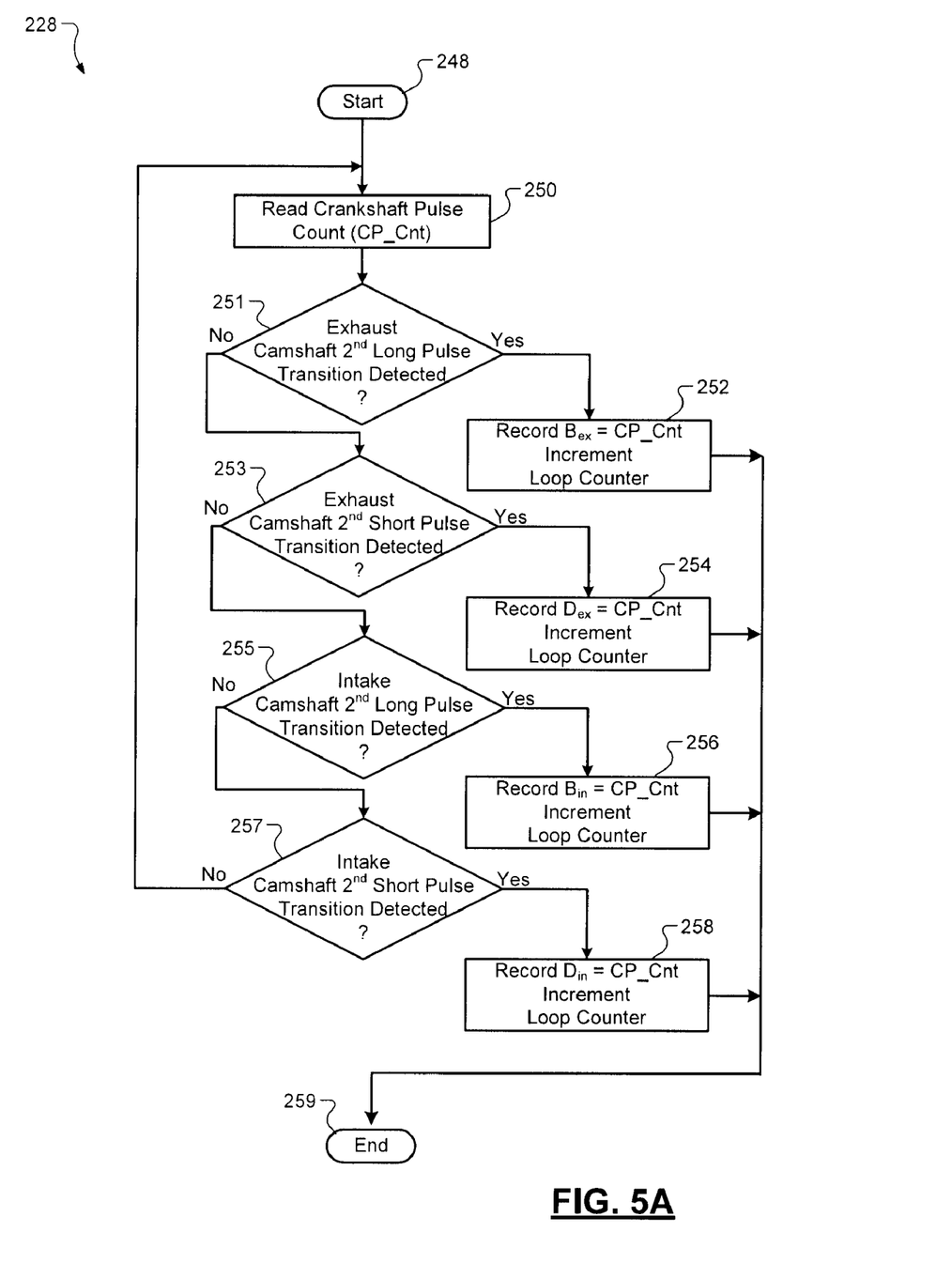

In FIG. 5A, an example method 228 for detecting camshaft pulse transition and collecting data set of camshaft relative positions is shown. In step 250 the ECM 110 reads a crankshaft pulse count of current iteration. For each iteration, the ECM 110 recursively evaluates the conditions in steps 251, 253, 255 and 257 to detect a camshaft pulse transition. The camshaft pulse transition may be a camshaft long pulse or short pulse transition.

When a camshaft pulse transition is detected, the crankshaft pulse count is recorded for the pulse transition to record a corresponding position in steps 252, 254, 256 and 258, respectively. A loop counter is incremented every time when a camshaft pulse transition is detected and data is recorded. The loop counter is used in the step 230 of FIG. 5 to determine whether a full set of camshaft pulse transition data is collected.

Figure 7:
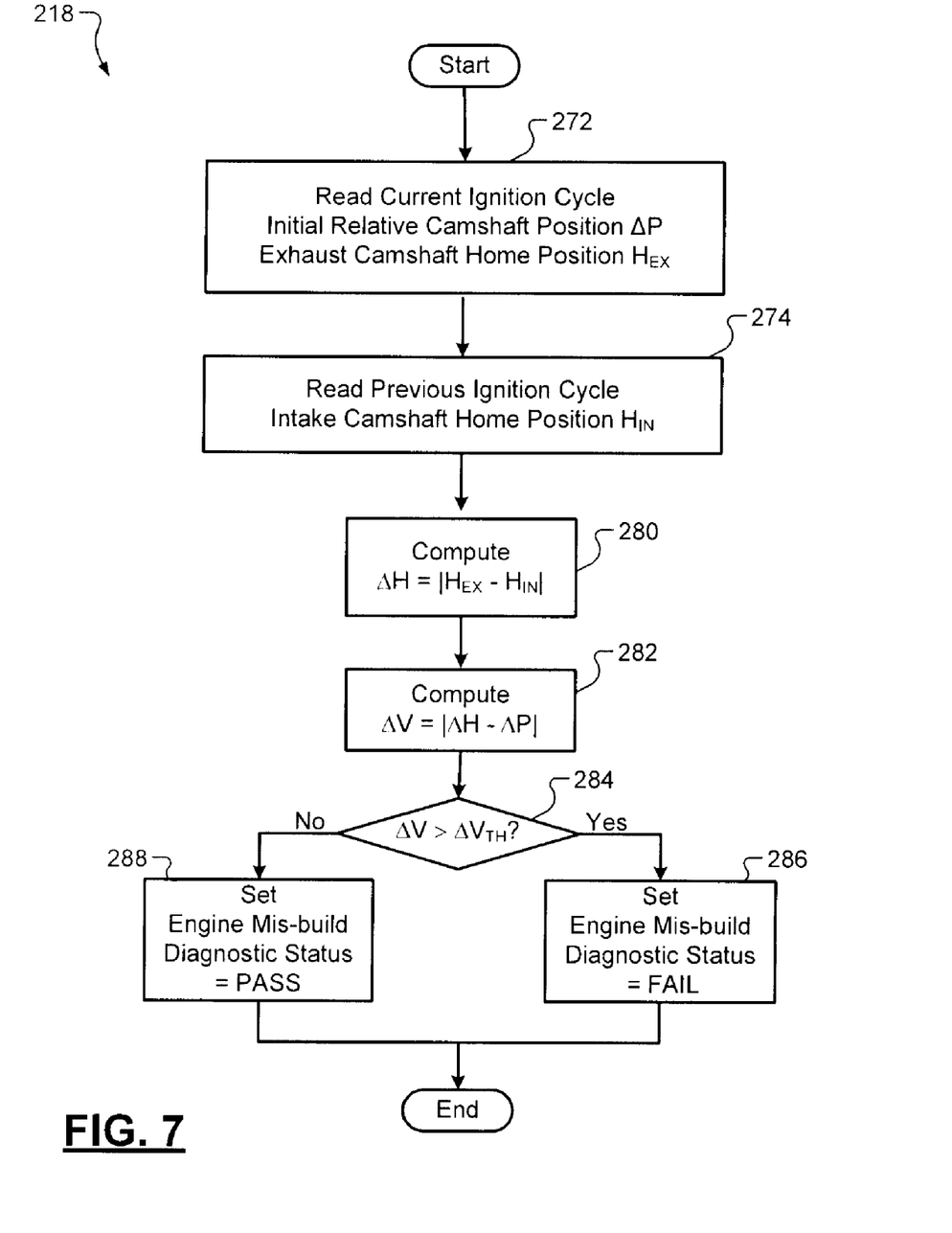
FIG. 7 illustrates a method of detecting and diagnosing an engine mis-build according to the principles of the present disclosure.

Referring now also to FIG. 7, a method 218 for detecting an engine mis-build is illustrated. For illustrative purpose, the intake camshaft 134 is used as an active camshaft and the exhaust camshaft 136 is used as an inactive camshaft herein. In step 272, the ECM 110 reads the startup relative position ΔP determined in step 205 and the exhaust camshaft home position $H_{EX}$ determined in step 211.

In step 274, the ECM 110 reads a home position of the intake camshaft 134. During engine startup, an intake camshaft home position is unavailable from a present engine ignition cycle. The ECM 110 sets the intake camshaft home position $H_{IN}$ using an intake home position data $H_{IN\_previous}$ of a previous ignition cycle when the data status 173 indicates that $H_{IN\_present}$ of the present ignition cycle is unavailable, $$H_{IN} = H_{IN\_previous} \quad (7)$$

Alternatively, the ECM 110 may set the intake camshaft home position $H_{IN}$ using an intake camshaft home position data $H_{IN\_present}$ of present ignition cycle when the $H_{IN\_present}$ is available, $$H_{IN} = H_{IN\_present} \quad (8)$$

According to the present invention, an engine mis-build may be detected by comparing a difference in home positions between intake and exhaust camshafts with the startup relative position. In a healthy engine operating condition, the difference in camshaft home positions and the startup relative position are consistent with each other with a minimal discrepancy less than a tolerance. When a slip occurs in timing element, the slip can be detected via a discrepancy between the difference in camshaft home positions and the startup relative position.

In step 280, the ECM 110 determines a difference in camshaft home positions ΔH based on the intake and exhaust camshaft home position $H_{IN}$ and $H_{EX}$ using equation 9:

$$\Delta H = |H_{EX} - H_{IN}| \quad (9)$$

In step 282, the ECM 110 determines a variability measure ΔV based on the difference in camshaft home positions ΔH and the startup relative position ΔP $$\Delta V = |\Delta H - \Delta P| \quad (10)$$

The variability measure ΔV is further compared with a variability threshold $\Delta V_{TH}$ in step 284 to determine an engine mis-build diagnostic status. The engine mis-build diagnostic status is set to FAIL in step 286 when the variability measure ΔV exceeds the variability threshold $\Delta V_{TH}$, If $\Delta V \geq \Delta V_{TH} \Rightarrow$ Engine mis-build diagnostic
status=FAIL (11)

The engine mis-build diagnostic status is set to PASS in step 288 when the variability measure ΔV is below the variability threshold $\Delta V_{TH}$, If $\Delta V < \Delta V_{TH} \Rightarrow$ Engine mis-build diagnostic
status=PASS (12)

In one embodiment, the value of $\Delta V_{TH}$ is 15.6 degrees crankshaft angle. In another embodiment, the value of $\Delta V_{TH}$ may be 15.6 degrees reduced by a pre-determined error margin.

A diagnostic trouble code (DTC) may be generated by the diagnosis module 126 when the engine mis-build diagnostic status is "FAIL". The DTC provides a warning to prevent damage to the engine.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating an engine comprising:
   determining a relative position between a first camshaft and a second camshaft during a startup event of the engine when the first camshaft is at a first home position and the second camshaft is at a second home position,
   wherein the first home position is a first preset angular position of the first camshaft relative to a crankshaft and the second home position is a second preset angular position of the second camshaft relative to the crankshaft when the engine is in an OFF state;
   generating a first estimate of the first home position; and
   diagnosing a mis-build of the engine based on the relative position, the first estimate and a second estimate of the second home position.

2. The method of claim 1, wherein the mis-build comprises slip of a timing element connected between the crankshaft and at least one of the first camshaft and the second camshaft.

3. The method of claim 1, wherein the relative position is determined before the first estimate is generated.

4. The method of claim 1, wherein the relative position is determined based on a detection of a valid position pulse of a crankshaft position sensor, and
   wherein the detection is independent of an engine synchronization event, and
   wherein the engine synchronization event comprises determining a position of an engine piston relative to the crankshaft.

5. The method of claim 1 further comprising enabling the second camshaft to be phased, wherein the diagnosing of the mis-build comprises:
   determining a first difference between the first estimate and the second estimate,
   wherein the second estimate is generated during a first key cycle, and the first estimate is generated during a second key cycle that is after the first key cycle;
   determining a second difference between the relative position and the first difference; and
   determining an engine mis-build diagnostic status based on the second difference and a mis-build threshold.

6. The method of claim 1 further comprising detecting a crankshaft pulse signal,
   wherein the relative position is determined within N engine revolutions from the detecting of the crankshaft pulse signal, where N is an integer.

7. The method of claim 1 further comprising generating a third estimate of the second home position after the startup event,
   wherein the startup event ends when a speed of the engine exceeds a speed threshold.

8. The method of claim 7, wherein the generating of the third estimate comprises:
   detecting a parking condition of the second camshaft based on the speed, a load of the engine and a temperature of the engine;
   moving the second camshaft to the second home position; and
   generating the third estimate after the second camshaft is at the second home position.

9. The method of claim 1 further comprising enabling the second camshaft to be phased after the determining of the relative position and before the startup event ends,
   wherein the startup event ends when a speed of the engine exceeds a speed threshold.

10. The method of claim 9 further comprising phasing the second camshaft after the enabling of the second camshaft and before the startup event ends.

11. A system for operating an engine comprising:
    a startup process module that determines a relative position between a first camshaft and a second camshaft during a startup event of the engine when the first camshaft is at a first home position and the second camshaft is at a second home position,
    wherein the first home position is a first preset angular position of the first camshaft relative to a crankshaft and the second home position is a second preset angular position of the second camshaft relative to the crankshaft when the engine is in an OFF state;
    a post-sync process module that:
       generates a first estimate of the first home position, and
       determines a value of a second estimate of the second home position; and
    a diagnosis module that diagnoses a mis-build of the engine based on the relative position, the first estimate and the value.

12. The system of claim 11, wherein the startup process module determines the relative position before the post-sync process module determines the first estimate.

13. The system of claim 11, wherein the startup process module determines the relative position before the startup event ends, and
    wherein the startup event ends when a speed of the engine exceeds a speed threshold.

14. The system of claim 11, wherein the diagnosis module further:
    determines a first difference between the first estimate and the value;
    determines a second difference between the first difference and the relative position; and
    detects the mis-build when the second difference exceeds a mis-build threshold.

15. The system of claim 11, wherein the post-sync process module further generates a third estimate of the second home position after the startup event, and
    wherein the startup event ends when a speed of the engine exceeds a speed threshold.

16. The system of claim 15, wherein the post-sync process module further:
    detects a parking condition of the second camshaft based on the speed, a load of the engine and a temperature of the engine;
    commands the second camshaft to the second home position; and
    generating the third estimate after the second camshaft is at the second home position.

17. The system of claim 11, wherein the post-sync process module generates the second estimate during a first key cycle, and
    wherein the post-sync process module generates the first estimate during a second key cycle that is after the first key cycle, and
    wherein the value is stored in a memory from the first key cycle.

18. The system of claim 11, wherein the startup module further:
    detects a crankshaft pulse signal; and starts determining the relative position within N engine revolutions from detecting the crankshaft pulse signal where N is an integer.

19. The system of claim 11 further comprising a phasing module that enables the second camshaft to be phased after the startup process module determines the relative position and before the startup event ends, wherein the startup event ends when a speed of the engine exceeds a speed threshold.

20. The system of claim 19, wherein the phasing module further phases the second camshaft after the second camshaft is enabled and before the startup event ends.

* * * * *